US007635540B2

United States Patent
Sato et al.

(10) Patent No.: US 7,635,540 B2
(45) Date of Patent: *Dec. 22, 2009

(54) NEGATIVE ELECTRODE FOR NON-AQUEOUS ELECTROLYTE SECONDARY BATTERY AND NON-AQUEOUS ELECTROLYTE SECONDARY BATTERY COMPRISING THE SAME

(75) Inventors: Toshitada Sato, Osaka (JP); Masaki Hasegawa, Hirakata (JP); Teruaki Yamamoto, Osaka (JP); Yasuhiko Bito, Sakai (JP)

(73) Assignee: Panasonic Corporation, Osaka (JP)

( * ) Notice: Subject to any disclaimer, the term of this patent is extended or adjusted under 35 U.S.C. 154(b) by 869 days.

This patent is subject to a terminal disclaimer.

(21) Appl. No.: 11/119,208

(22) Filed: May 2, 2005

(65) Prior Publication Data

US 2006/0105242 A1    May 18, 2006

(30) Foreign Application Priority Data

Nov. 15, 2004  (JP)  ............................. 2004-330608

(51) Int. Cl.
*H01M 4/38* (2006.01)
*H01M 10/40* (2006.01)

(52) U.S. Cl. ................................. 429/218.1; 429/231.8
(58) Field of Classification Search .............. 429/231.9, 429/231.95, 231.8, 218.1
See application file for complete search history.

(56) References Cited

U.S. PATENT DOCUMENTS

| 4,517,265 | A |   | 5/1985 | Belanger et al. |
| 4,957,833 | A |   | 9/1990 | Daifuku et al. |
| 5,556,721 | A |   | 9/1996 | Sasaki et al. |
| 6,051,340 | A |   | 4/2000 | Kawakami et al. |
| 6,090,505 | A | * | 7/2000 | Shimamura et al. ...... 429/218.1 |
| 6,432,585 | B1 |   | 8/2002 | Kawakami et al. |
| 6,569,568 | B2 |   | 5/2003 | Kobayashi et al. |
| 6,730,434 | B1 |   | 5/2004 | Kawakami et al. |
| 2003/0039891 | A1 |   | 2/2003 | Nitta et al. |
| 2003/0096168 | A1 |   | 5/2003 | Kasamatsu et al. |
| 2003/0175589 | A1 | * | 9/2003 | Kaminaka et al. ......... 429/218.1 |

FOREIGN PATENT DOCUMENTS

| CN | 1394363 A |   | 1/2003 |
| EP | 1 102 339 A2 |   | 5/2001 |
| EP | 1 463 131 A1 |   | 9/2004 |
| JP | 63-13267 A |   | 1/1988 |
| JP | 04-249862 A | * | 9/1992 |
| JP | 4-332472 A |   | 11/1992 |
| JP | 10-223221 A |   | 8/1998 |
| JP | 10-294112 A |   | 11/1998 |
| JP | 2000-243396 A |   | 9/2000 |
| JP | 2000-357515 A |   | 12/2000 |
| JP | 2001-243946 A |   | 9/2001 |
| JP | 2005-108774 A | * | 4/2005 |
| KR | 2001-0079867 A |   | 8/2001 |
| WO | WO 00/17102 A1 |   | 3/2000 |
| WO | WO 0017102 A1 | * | 3/2000 |
| WO | WO 2004/049473 A2 |   | 6/2004 |

OTHER PUBLICATIONS

IPDL Machine Translation of JP 2005-108774.*
Chinese Office Action issued in corresponding Chinese Patent Application No. CN 2005101201884, dated Mar. 16, 2007.

* cited by examiner

*Primary Examiner*—Gregg Cantelmo
(74) *Attorney, Agent, or Firm*—McDermott Will & Emery LLP (57) ABSTRACT

A negative electrode containing an alloying material and a graphite material for providing a non-aqueous electrolyte secondary battery with a high capacity and excellent cycle characteristics. The negative electrode includes graphite and an alloying material capable of electrochemically absorbing and desorbing Li. The alloying material includes an A phase composed mainly of Si and a B phase including an intermetallic compound of a transition metal element and Si. The A phase and/or the B phase include a microcrystalline or amorphous region. The weight percentage of the A phase relative to the total weight of the A phase and the B phase is greater than 40% and not greater than 95%. The weight percentage of the graphite relative to the total weight of the alloying material and the graphite is not less than 50% and not greater than 95%.

5 Claims, 4 Drawing Sheets

NEGATIVE ELECTRODE FOR NON-AQUEOUS ELECTROLYTE SECONDARY BATTERY AND NON-AQUEOUS ELECTROLYTE SECONDARY BATTERY COMPRISING THE SAME

FIELD OF THE INVENTION

The present invention relates to a non-aqueous electrolyte secondary battery with a high capacity and a long life. More specifically, the present invention relates to an improvement in the negative electrode for a non-aqueous electrolyte secondary battery.

BACKGROUND OF THE INVENTION

An extensive research and development has been conducted on the use of lithium metal, which is capable of realizing high voltage and high energy density, as the negative electrode of non-aqueous electrolyte secondary batteries. This has led to the current commercialization of lithium ion batteries that use a graphite material in the negative electrode, which material reversibly absorbs and desorbs lithium and provides good cycle life and safety.

However, the practical (i.e., useful) capacity of batteries using a graphite material-based negative electrode is approximately 350 mAh/g, which is very close to the 372 mAh/g theoretical capacity of the graphite material. Therefore, as long as a graphite material is used in the negative electrode, it is not feasible to achieve a dramatic increase in capacity. Meanwhile, as more and more portable appliances become available, non-aqueous electrolyte secondary batteries used as the energy source of such appliances are required to have higher capacities. Accordingly, in order to achieve higher capacities, negative electrode materials having a higher capacity than graphite become necessary.

Alloy forming materials (hereinafter referred to as "alloying materials") containing silicon or tin are currently receiving attention as the materials that offer a higher capacity. Metal elements, such as silicon and tin, are capable of electrochemically absorbing and desorbing lithium ions, thereby enabling a very large capacity charge and discharge in comparison with graphite materials. For example, it is known that silicon has a theoretical discharge capacity of 4199 mAh/g, which is 11 times higher than that of graphite.

When an alloying material absorbs lithium, it forms a lithium alloy, such as a lithium-silicon alloy or a lithium-tin alloy. The formation of a lithium alloy involves a very large expansion caused by the change in its crystal structure. For example, the volume of silicon theoretically expands 4.1-fold when it absorbs lithium to its maximum. As a result, the active material, i.e., the alloyed material, separates and falls off the current collector of the negative electrode, thereby resulting in loss of electrical conduction and a degradation in battery characteristics, particularly high-rate discharge characteristics and charge and discharge (hereinafter referred to as "charge/discharge") cycle characteristics. In the case of graphite, its volume expands only 1.1-fold, because lithium is intercalated between the layers of graphite (intercalation reaction).

In order to lessen such expansion and obtain higher capacities, the use of a combination of graphite and an alloying material has extensively been attempted. However, when graphite and an alloying material are simply mixed, the alloying material expands in uneven directions in the electrode plate, so that the graphite particles around the alloying material are moved by the stress exerted by the expansion of the alloying material, thereby resulting in separation. Consequently, the electronic conductivity lowers and the high-rate discharge characteristics and charge/discharge cycle characteristics of the resultant battery deteriorate, in the same manner as the negative electrode including an alloy material alone.

Japanese Laid-Open Patent Publication No. 2000-357515 proposes controlling the ratio of the particle size RSi of a silicide to the particle size Rc of a carbon material, i.e., the RSi/Rc ratio, to 1 or less, in order to lessen the impact of large expansion of the alloying material and improve battery characteristics. However, even if such particle size control can lessen the impact of alloy expansion, it cannot suppress the degradation of current collecting property caused by cracking of particles of alloying material and the like. Also, charge/discharge cycles cause particles of alloying material to become cracked, thereby increasing the surface area of the alloy material. Thus, there is also a problem of side reaction, i.e., formation of a coating film on the surface of the alloy. Accordingly, this proposal is not practical.

Japanese Laid-Open Patent Publication No. 2000-243396 proposes embedding, in a carbon particle, a metal particle or a metal oxide particle that is capable of electrochemically reacting with Li. According to this proposal, by fixing the metal particle or metal oxide particle to the surface of the carbon particle, the separation of the metal or metal oxide particle due to its expansion is suppressed. In this case, this proposal is highly effective in the initial stage of charge and discharge cycles, but repetitive expansion and contraction causes the metal particle or metal oxide particle to separate from the carbon particle. As a result, the expansion rate of the negative electrode increases, and separation occurs throughout the electrode plate.

As described above, in order to make full use of a high capacity alloying material as a negative electrode material, the use of a combination of an alloying material and a graphite material has been extensively examined, but no proposal has succeeded in sufficiently reducing the impact of uneven expansion of the alloy material. Specifically, according to conventional proposals, the electrical conduction between particles in a negative electrode is broken, and an alloying material and a graphite material separate from a current collector. Consequently, the electronic conductivity of the negative electrode lowers, leading to a degradation in battery characteristics.

BRIEF SUMMARY OF THE INVENTION

In view of the above problems which occur when a graphite material and an alloying material that contains Si and is capable of electrochemically absorbing and desorbing Li are used as active materials, the present invention has been made with the aim of suppressing the deterioration of battery characteristics caused by the above-described expansion of the alloying material.

The present invention relates to a negative electrode for a non-aqueous electrolyte secondary battery, comprising graphite and an alloying material capable of electrochemically absorbing and desorbing Li. The alloying material includes an A phase composed mainly of Si and a B phase including an intermetallic compound of a transition metal element and Si. At least one of the A phase and the B phase include a microcrystalline or amorphous region. The weight percentage of the A phase relative to the total weight of the A phase and the B phase is greater than 40% and not greater than 95%. The weight percentage of the graphite relative to the total weight of the alloying material and the graphite is not less than 50% and not greater than 95%.

The alloying material desirably exists in gaps between particles of the graphite.

The alloying material desirably has a maximum particle size of 10 μm or less.

The ratio of the mean particle size of the alloying material to the mean particle size of the graphite is desirably in the range of 0.15 to 0.90.

The negative electrode according to the present invention can further include an auxiliary conductive agent. The auxiliary conductive agent desirably has a specific surface area of 10 m²/g or more.

The weight percentage of the auxiliary conductive agent relative to the total weight of the alloy material, the graphite and the auxiliary conductive agent is desirably 10% or less.

The present invention also pertains to a non-aqueous electrolyte secondary battery comprising a positive electrode capable of electrochemically absorbing and desorbing Li, a negative electrode and a non-aqueous electrolyte, wherein the negative electrode includes graphite and an alloying material capable of electrochemically absorbing and desorbing Li, the alloying material includes an A phase composed mainly of Si and a B phase including an intermetallic compound of a transition metal element and Si, at least one of the A phase and the B phase includes a microcrystalline or amorphous region, the weight percentage of the A phase relative to the total weight of the A phase and the B phase is greater than 40% and not greater than 95%, and the weight percentage of the graphite relative to the total weight of the alloying material and the graphite is not less than 50% and not greater than 95%.

According to the present invention, in a negative electrode employing a combination of an alloying material and a graphite material, the deterioration of battery characteristics due to the expansion of the alloy material can be suppressed. Therefore, it is possible to realize a non-aqueous electrolyte secondary battery with a high capacity and excellent cycle characteristics.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

An alloying material capable of electrochemically absorbing and desorbing Li according to the present invention has different characteristics from those of conventional alloying materials. The alloying material of the present invention includes an A phase composed mainly of Si and a B phase comprising an intermetallic compound of a transition metal element and Si. This alloying material lessens the expansion and suppresses the degradation of the electronic conductivity of the resultant negative electrode due to expansion and contraction. Therefore, a negative electrode for a non-aqueous electrolyte secondary battery according to the present invention including this alloying material and graphite gives a battery having a high capacity and excellent cycle characteristics.

The A phase is a phase that absorbs and desorbs Li, being capable of electrochemically reacting with Li. The A phase may be composed mainly of Si, and is preferably composed simply of Si. When the A phase is composed only of Si, the alloying material can absorb and desorb an extremely large amount of Li per unit weight or unit volume. However, since Si itself is a semiconductor, it has poor electronic conductivity. It is therefore effective to make the A phase include a small amount of an element, such as phosphorus (P) or hydrogen (H), or a transition metal element, in an amount up to about 5% by weight.

The B phase comprises an intermetallic compound of a transition metal element and Si. Since an intermetallic compound containing Si has a high affinity for the A phase, cracking is unlikely to occur at the interface between the A phase and the B phase. Also, the B phase has a higher electronic conductivity and a higher hardness than the phase composed mainly of Si. Accordingly, the B phase compensates for the poor electronic conductivity of the A phase and resists expansion stress so as to maintain the shape of the particles of alloying material. Two or more kinds of B phases may be present. That is, two or more kinds of intermetallic compounds each having a different composition may be present as the B phases. For example, $MSi_2$ and $MSi$ (M is a transition metal) may be present in the particles of alloying material. Also, intermetallic compounds each having a different transition metal element, such as $M^1Si_2$ and $M^2Si_2$ ($M^1$ and $M^2$ are different transition metals), may be present in the particles.

The transition metal element in the B phase is preferably at least one selected from the group consisting of Ti, Zr, Ni, Co, Mn, Fe, and Cu, and more preferably at least one selected from the group consisting of Ti and Zr. Silicides of these elements have a higher electronic conductivity and a higher hardness than silicides of other elements.

The A phase and/or the B phase comprise a microcrystalline or amorphous region. If a crystalline alloying material is used, particles thereof tend to become cracked upon Li absorption, which causes a rapid deterioration in the current collecting property of the negative electrode, thereby resulting in a degradation in battery characteristics. In contrast, if a microcrystalline or amorphous alloying material is used, particles thereof are unlikely to become cracked upon expansion due to Li absorption.

According to the present invention, when the diameter of crystal grains (crystallites) of an alloying material is 50 nm or less, the alloying material is defined as microcrystalline. When an alloying material has a microcrystalline region, the X-ray diffraction spectrum of the particles of alloying material shows one or more peaks that are, although not sharp, relatively clear such that the half width is recognizable. The diameter of crystal grains (crystallites) of an alloying material is calculated from the half width of the most intensive peak in the X ray diffraction spectrum of the particles of the alloying material, and the Scherrer equation.

On the other hand, if an alloying material comprises an amorphous region, the X-ray diffraction spectrum of particles of such an alloying material shows a broad halo pattern in the range of 2θ=15 to 40° such that the half width is not recognizable.

The weight percent of the A phase relative to the total weight of the A phase and the B phase is greater than 40% and not greater than 95%. When the weight percent of the A phase is greater than 40%, a high capacity can be achieved effectively. Also, when the weight percent of the A phase is 95% or less, the low electronic conductivity of the A phase can be compensated for by the B phase, the shape of particles of alloying material can be maintained effectively, and the particles of alloying material can be easily made microcrystalline or amorphous. From the viewpoint of making these effects more remarkable, the weight percent of the A phase relative to the total weight of the A phase and the B phase is desirably not less than 65% and not more than 85%, and more preferably not less than 70% and not more than 80%.

Also, if the weight percent of the A phase exceeds 95%, it becomes difficult to make the particles of alloying material microcrystalline or amorphous, which is not suitable for the present invention. Conversely, if the weight percent of the A phase is less than 40%, the resultant battery has a lower capacity than conventional batteries using graphite in the negative electrode, which is not suitable for the present invention.

The Si content in the alloying material according to the present invention is preferably 60% by weight or more. When the weight percent of Si relative to the whole alloy is 60% or more, Si and the transition metal form an intermetallic compound (silicide) such that the weight percent of the A phase exceeds 40%. Therefore, it becomes possible to effectively realize a high capacity.

The negative electrode of the present invention contains the above-described alloying material and graphite. From the viewpoint of taking advantage of the abilities of both the alloying material and the graphite in good balance, the weight percent of the graphite relative to the total weight of the alloying material and the graphite is not less than 50% and not greater than 95%, and preferably not less than 65% and not greater than 85%. If the graphite is less than 50% by weight, the amount of the graphite contacting the alloying material decreases, and the contact between the particles of alloying material increases. As a result, the expansion of the alloying material is apt to create gaps inside the negative electrode, thereby increasing the expansion of the whole negative electrode. On the other hand, if the graphite is more than 95% by weight, the contribution of the alloying material to the capacity becomes extremely small, so that the capacity of the resultant electrode is almost equivalent to that of a negative electrode using graphite alone.

The graphite used in the present invention may be any graphite material that can be generally used in non-aqueous electrolyte secondary batteries. For example, natural graphites, such as flake graphite, and artificial graphites produced by various methods may be used.

The mean particle size of the graphite is preferably not less than 5 μm and not more than 50 μm, and more preferably not less than 7 μm and not more than 25 μm. If the mean particle size of the graphite is too small, the ability to accommodate deformation increases, thereby lessening the adverse effect of the alloying material expansion on the electrode plate, but the specific surface area of the graphite itself increases. In order to suppress the side reaction between the graphite and an electrolyte or the like, reduce the formation of a coating film on the graphite surface, and minimize the irreversible capacity of the negative electrode, it is desirable that the mean particle size of the graphite be 5 μm or more so as not to increase the specific surface area of the graphite itself. Also, if the mean particle size of the graphite is larger than 50 μm, the surface of the resultant negative electrode tends to become roughened, and the gaps inside the negative electrode become larger. Thus, it becomes difficult to collect current from the alloying material inside the negative electrode. From the viewpoint of obtaining a negative electrode with excellent current collecting property, it is desirable that the mean particle size of the graphite be 50 μm or less.

Generally, the negative electrode for non-aqueous electrolyte secondary batteries comprises a metal foil current collector and a negative electrode material mixture layer formed on each side of the current collector. Thus, the particle size of the graphite and the alloying material may be set such that it is smaller than the thickness of the negative electrode material mixture layer on one side.

Figure 1:
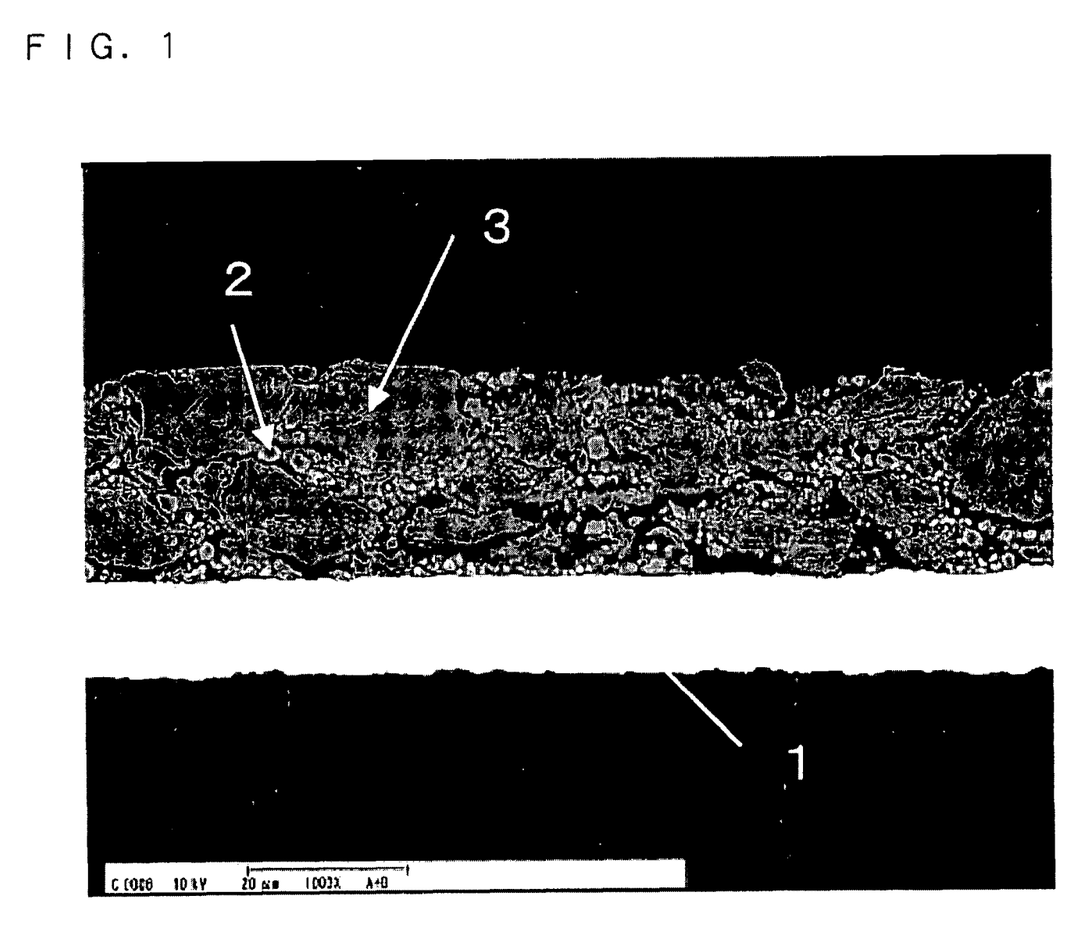
FIG. 1 is a photograph of a section of one exemplary negative electrode in accordance with the present invention (at 1000 magnification)

It is desirable that the alloying material exist in gaps between the particles of the graphite. FIG. 1 is a photograph of a section of an exemplary negative electrode of the present invention. The negative electrode of FIG. 1 comprises a current collector 1 and a mixed material layer carried on one side of the current collector 1. The mixed material layer includes graphite particles 3 with a large particle size and particles of alloying material 2 that are positioned so as to fill the gaps between the graphite particles 3. Also, there are suitable gaps around the particles of alloying material 2. Accordingly, when the particles 2 expand, such a structure can lessen the expansion and facilitate collection of current upon the expansion. Also, this structure makes it possible to make the alloying material fully contact an electrolyte, leading to an improvement in high-rate discharge characteristics and charge/discharge cycle characteristics.

In order to easily obtain the structure as shown in FIG. 1, the maximum particle size of the alloying material is desirably 10 μm or less, and more preferably 5 μm or less. If the maximum particle size of the alloying material is larger than 10 μm, the proportion of the particles of alloying material entering between the graphite particles decreases, and the proportion of the particles of alloying material that agglomerate increases. If the particles of the alloy material agglomerate, they push against one another when they expand, which may cause the negative electrode to expand excessively.

In order to easily obtain the structure as illustrated in FIG. 1, the ratio of the mean particle size of the alloying material (R alloy) and the mean particle size of the graphite (R graphite), i.e., the R alloy/R graphite ratio, is desirably in the range of 0.15 to 0.90. For example, when the mean particle size of the graphite (R graphite) is 18 μm, the preferable range of the mean particle size of the alloying material (R alloy) is 2.7 μm to 16.2 μm. However, as mentioned above, it is more desirable that the maximum particle size of the alloying material be 10 μm or less. Accordingly, the optimum range of R alloy is not less than 2.7 μm and not more than 10 μm.

If the R alloy/R graphite ratio is less than 0.15, a large number of particles of the alloying material tend to be squeezed into the gaps between the graphite particles. Thus, when the particles of the alloying material expand, they push against one another, which may cause the negative electrode to expand relatively largely. On the other hand, if the R alloy/R graphite ratio is greater than 0.9, the size of the graphite particles is almost equal to the size of the particles of alloying material. Thus, the gaps inside the negative electrode, which serve to lessen the expansion of the particles of alloying material, decrease. The most preferable range of the R alloy/R graphite ratio is 0.2 to 0.4. In this range, the ability to lessen the expansion of the alloying material becomes highest.

The negative electrode can further include an auxiliary conductive agent. The auxiliary conductive agent is mainly added to improve the efficiency of collecting current from the alloy material. It is therefore preferred that the auxiliary conductive agent exist mainly near the particles of alloying material.

The specific surface area of the auxiliary conductive agent is desirably 10 m$^2$/g or more. Although an auxiliary conductive agent having a specific surface area of less than 10 m$^2$/g can improve the current-collecting efficiency, it is desirable to use an auxiliary conductive agent having a specific surface area of 10 m$^2$/g or more, in order to obtain the effect of improving the current-collecting efficiency by using a small amount thereof. Preferable examples of the auxiliary conductive agent include carbon blacks, and among them, acetylene black is preferred.

In order to suppress the decrease in discharge capacity and the increase in irreversible capacity due to side reaction, the ratio of the auxiliary conductive agent to the total weight of the alloying material, the graphite and the auxiliary conductive agent is desirably 10% by weight or less, and more desirably 5% by weight or less.

The negative electrode includes a binder which binds the graphite material and the alloying material together and fixes the mixed material layer to a current collector. The binder is selected to be a material that is electrochemically inactive with respect to Li in the potential range of the negative electrode and that has as little effect as possible on other substances. Suitable examples of the binder include styrene-butadiene copolymer rubber, polyacrylic acid, polyethylene, polyurethane, polymethyl methacrylate, polyvinylidene fluoride, polytetrafluoroethylene, carboxymethyl cellulose, and methyl cellulose. They may be used singly or in combination of two or more of them. With respect to the amount of the binder to be added, more is preferable, in terms of maintaining the structure of the mixed material mixture layer; however, in terms of enhancing battery capacity and discharge characteristics, less is preferable.

When the negative electrode of the present invention comprises a current collector made of a metal foil and a negative electrode mixed material layer carried on each side of the current collector, it is desirable to use copper foil or copper alloy foil as the current collector. In using copper alloy foil, the copper content is preferably 90% by weight or more. In order to improve the strength or flexibility of the current collector, it is effective that the current collector contain an element such as P, Ag, or Cr.

The thickness of the current collector is preferably not less than 6 μm and not greater than 40 μm. If the current collector has a thickness of less than 6 μm, it is difficult to handle and lacks sufficient strength, so that it may become broken or wrinkled when the material mixture layer expands and contracts. On the other hand, if the current collector has a thickness of more than 40 μm, the volume ratio of the current collector to the battery increases, which is disadvantageous in terms of capacity depending on the kind of the battery. Also, thick current collectors are difficult to handle, for example, difficult to bend.

The negative electrode mixed material layer comprises a mixture of the alloying material, the graphite, the binder and the like, and it contains, if necessary, other additives, such as an auxiliary conductive agent. The thickness of the negative electrode mixed material layer on one side of the current collector is generally not less than 10 μm and not greater than 100 μm, and it is often not less than 50 μm and not more than 100 μm. Although the thickness of the mixed material layer may be less than 10 μm, care should be taken to see that the volume ratio of the current collector to the negative electrode does not become too large. Also, the thickness of the mixed material mixture layer may be more than 100 μm, but an electrolyte may not penetrate through to the vicinity of the current collector, thereby resulting in a degradation in high-rate discharge characteristics.

The density of the negative electrode mixed material layer is preferably 0.8 g/cm$^3$ to 2 g/cm$^3$ in a discharged state. The porosity of the negative electrode mixed material layer is desirably 70% or less. The porosity is calculated as follows.

(the measured density of the negative electrode mixed material layer)/(the true density of the negative electrode mixed material layer)×100(%)

The true density of the negative electrode mixed material layer is calculated from the respective true densities of the raw materials (alloying material, graphite, binder and the like) of the negative electrode mixed material and the mixing ratio thereof.

The non-aqueous electrolyte secondary battery according to the present invention includes the above-described negative electrode, a positive electrode capable of electrochemically absorbing and desorbing Li, and a non-aqueous electrolyte.

The positive electrode may be any positive electrode that is conventionally suggested or disclosed in related arts, without any particular limitation. The positive electrode may be produced by conventional methods. For example, the positive electrode can be obtained by mixing a positive electrode active material, a conductive agent such as carbon black and a binder such as polyvinylidene fluoride together in a liquid phase, applying the resultant paste onto a positive electrode current collector made of Al or the like, and drying and rolling it.

The positive electrode active material may be any positive electrode active material that is conventionally suggested or disclosed in related arts, without any particular limitation. However, lithium containing transition metal compounds are preferable. Typical examples of the lithium containing transition metal compounds include, but are not limited to, LiCoO$_2$, LiNiO$_2$, LiMn$_2$O$_4$, and LiMnO$_2$. Compounds obtained by replacing the transition metal element of the above-mentioned compounds with a different metal element are also used preferably. Examples include LiCo$_{1-x}$Mg$_x$O$_2$, LiNi$_{1-y}$Co$_y$O$_2$, and LiNi$_{1-y-z}$Co$_y$Mn$_z$O$_2$ (x, y, and z are positive).

The non-aqueous electrolyte may be any electrolyte that is conventionally suggested and disclosed in related arts, without any particular limitation. However, an electrolyte comprising a non-aqueous solvent and a lithium salt that is soluble therein is preferred. A common non-aqueous solvent is a solvent mixture of a cyclic carbonate, such as ethylene carbonate or propylene carbonate, and a chain carbonate, such as dimethyl carbonate, diethyl carbonate, or ethyl methyl carbonate. Further, γ-butyrolactone, dimethoxyethane or the like may be mixed in a non-aqueous solvent. Also, examples of the lithium salt include inorganic lithium fluorides and lithium imide compounds. The former examples include LiPF$_6$ and LiBF$_4$, and the latter examples include LiN(CF$_3$SO$_2$)$_3$. Further, LiClO$_4$, LiCF$_3$SO$_3$ or the like may be mixed in the lithium salt. The non-aqueous electrolyte may be a gel electrolyte or a solid electrolyte.

A separator is placed between the positive electrode and the negative electrode in order to prevent internal short-circuits therebetween. The separator may be made of any material that allows the non-aqueous electrolyte to pass through to a suitable extent and prevents the contact between the positive electrode and the negative electrode. A microporous film made of polyethylene, polypropylene or the like is generally used in non-aqueous electrolyte secondary batteries, and the thickness thereof is generally not less than 10 μm and not more than 30 μm.

The present invention is applicable to non-aqueous electrolyte secondary batteries of various shapes, such as cylindrical, flat, coin, and rectangular shapes, and the battery shape is not particularly limited. The present invention is applicable to various sealing types of batteries, including batteries in which power generating elements, such as electrodes and an electrolyte, are accommodated in a metal battery case or a case made of a laminated film. There is no particular limitation with respect to how the batteries are sealed.

In the following, the present invention will be specifically described by way of Examples and Comparative Examples. The following Examples, however, only show preferable embodiments of the present invention, and hence, the present invention is not limited to the following Examples.

EXAMPLE 1

In Examples and Comparative Examples, negative electrodes and cylindrical batteries were produced in the following manner, and their cycle life and discharge capacity were evaluated.

(1) Alloying Material Preparation

Ti metal with a purity of 99.9% and a particle size of 100 to 150 μm was mixed with Si with a purity of 99.9% and a mean particle size of 3 μm in a weight ratio of Ti:Si=9.2:90.8.

This powder mixture of 3.5 kg was placed in the container of a vibration mill (FV-20, manufactured by Chuo Kakohki Co., Ltd.). Then, 2-cm-diameter stainless steel balls were placed therein such that they occupied 70% of the internal volume of the container. After the container was evacuated, Ar (purity 99.999%, manufactured by Nippon Sanso Corporation) was introduced thereinto so as to provide a pressure of 1 atmosphere. The operating conditions of the mill were: amplitude of 8 mm and revolution frequency of 1200 rpm. Under such conditions, the mechanical alloying operation was performed for 80 hours.

The Ti—Si alloy obtained by the above operation was removed from the container, and its particle size distribution was examined. It was found that this alloy had a wide particle size distribution of 0.5 μm to 80 μm. The Ti—Si alloy was classified with a sieve (10 μm mesh size), which gave an alloying material (hereinafter referred to as "alloy a") having a maximum particle size of 10 μm and a mean particle size of 8 μm.

Figure 2:
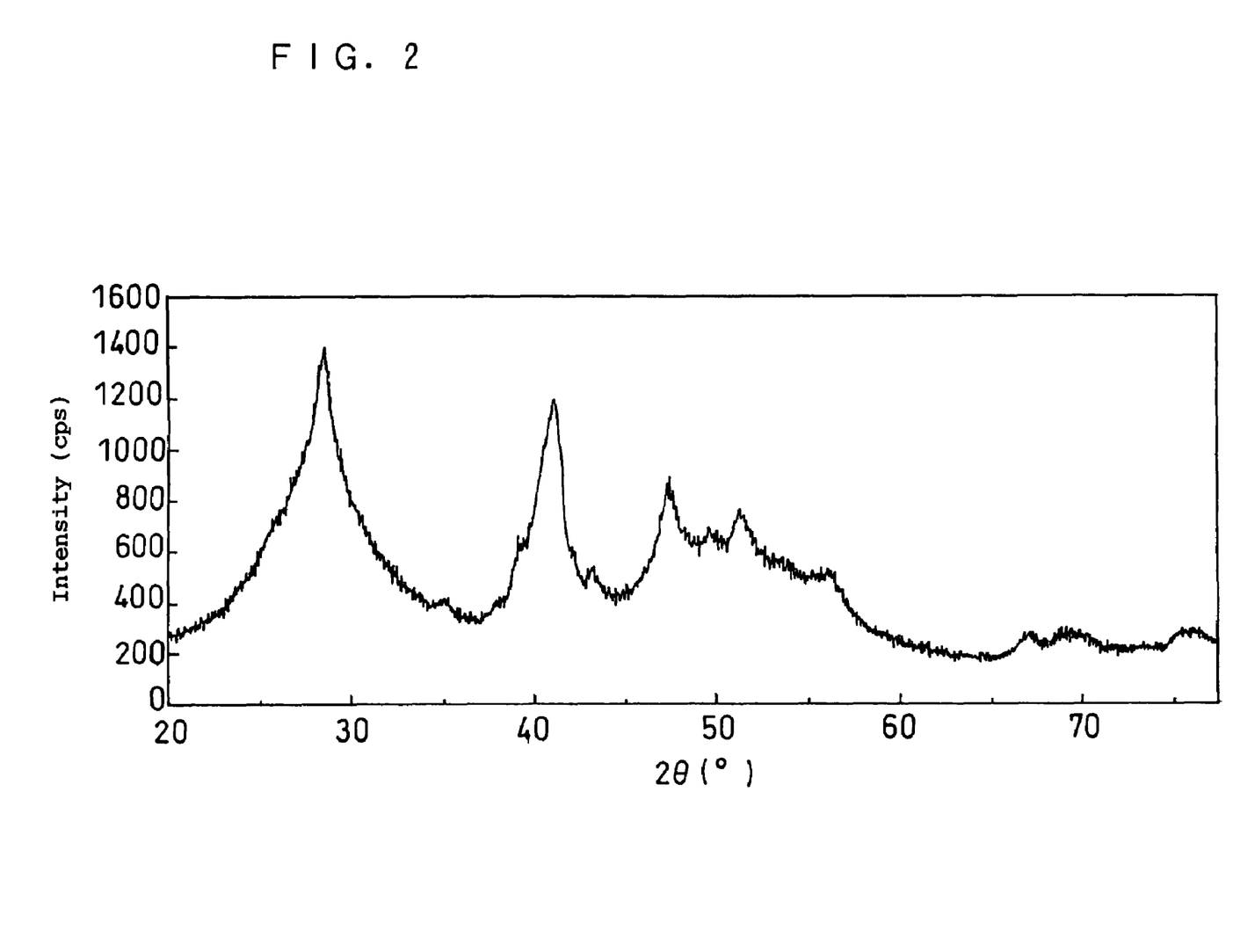
FIG. 2 is an XRD profile of a Ti—Si alloying material in accordance with the present invention.

The alloying material a was measured by X-ray diffraction analysis, and an XRD profile as shown in FIG. 2 was obtained. As can be seen from FIG. 2, the alloying material a was a microcrystalline alloying material, and the size of its crystal grains (crystallites) calculated from the half width of the most intensive peak based on the Scherrer equation was 10 nm.

Figure 3:
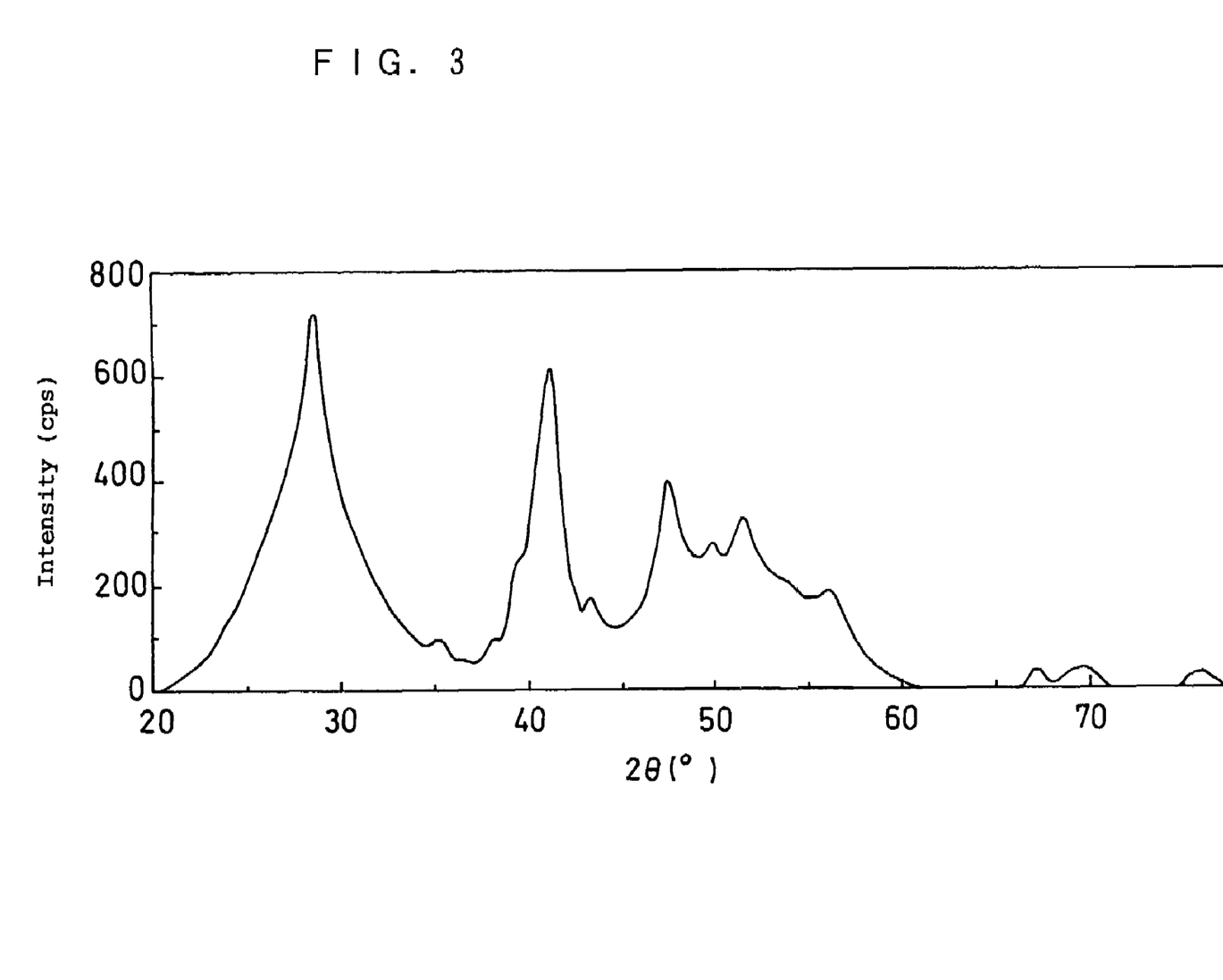
FIG. 3 is the XRD profile of FIG. 2 from which the background is removed.

In the XRD profile, the maximum peak appeared around 2θ=28 to 29°, and the half width of the peak was 0.5°. The half width was calculated from FIG. 3, which was obtained by removing the background from FIG. 2.

The result of the X-ray diffraction analysis indicated that a Si-only phase (A phase) and a $TiSi_2$ phase (B phase) were present in the alloying material a. When the ratio between the Si-only phase and the $TiSi_2$ phase was calculated on the assumption that the alloying material a was composed of these two phases only, it was found that $Si:TiSi_2$=80:20 (weight ratio).

A section of the alloying a was observed with a transmission electron microscope (TEM). As a result, it was found that the Si-only phase, composed of an amorphous region and crystal grains (crystallites) with a grain size of approximately 10 nm, and the $TiSi_2$ phase, composed of crystal grains (crystallites) with a grain size of approximately 15 to 20 nm, were present.

(2) Negative Electrode Preparation

The alloying material a was mixed with graphite in weight ratios as listed in Table 1. A negative electrode material mixture paste was prepared by adding 5 parts by weight of polyacrylic acid (molecular weight: 150,000, manufactured by Wako Pure Chemical Industries, Ltd.) as a binder per 100 parts by weight of the total of the alloy a and the graphite, and sufficiently kneading the mixture with pure water. Therein, the whole amount of the alloying material a and 2.5 parts by weight of polyacrylic acid were kneaded until they became homogeneous, and then, the graphite and the remaining polyacrylic acid were added to the mixture and kneaded.

The graphite used was flake graphite (KS-44) with a mean particle size of 20 μm, manufactured by Timcal Ltd.

The negative electrode material mixture paste was applied to both sides of a current collector, made of a 10-μm-thick electrolytic copper foil (manufactured by Furukawa Circuit Foil Co., Ltd). The current collector applied with the paste was then dried and rolled, which gave a negative electrode comprising the current collector and a negative electrode material mixture layer carried on each side of the current collector.

A section of the negative electrode thus obtained was observed with a scanning electron microscope (SEM), and it was found that the structure thereof was almost the same as that of FIG. 1. The density of the negative electrode material mixture layer was 1.3 to 1.4 g/cm³, and the porosity of the negative electrode material mixture layer was 40 to 45%.

(3) Positive Electrode Preparation $LiCoO_2$, which is a positive electrode active material, was synthesized by mixing $Li_2CO_3$ and $CoCO_3$ in a predetermined molar ratio, and heating the resultant mixture at 950° C. The synthesized $LiCoO_2$ was classified into a size of 45 μm or less. 100 parts by weight of the $LiCoO_2$ (positive electrode active material) was fully mixed with 5 parts by weight of acetylene black serving as a conductive agent, 4 parts by weight of polyvinylidene fluoride as a binder, and a proper amount of N-methyl-2-pyrrolidone as a dispersion medium, to obtain a positive electrode material mixture paste.

The positive electrode material mixture paste was applied on both sides of a current collector, made of a 15-μm-thick aluminum foil (manufactured by Showa Denko K.K.). The resultant current collector applied with the paste was then dried and rolled, which gave a positive electrode comprising the current collector and a positive electrode material mixture layer carried on each side of the current collector.

(4) Cylindrical Battery Preparation

Figure 4:
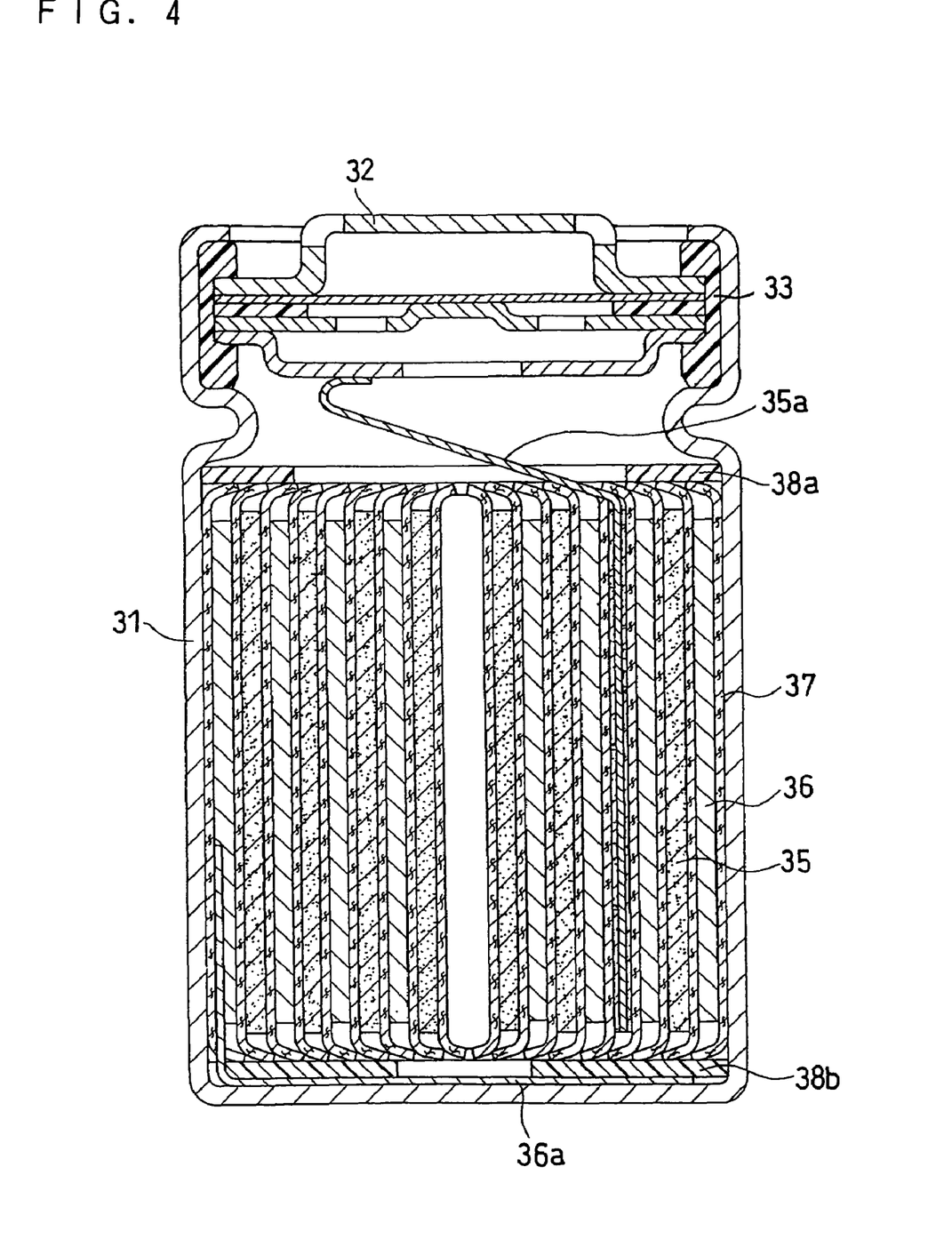
FIG. 4 is a longitudinal sectional view of a cylindrical battery prepared in examples of the present invention.

A cylindrical lithium ion secondary battery as illustrated in FIG. 4 was produced.

A positive electrode 35 and a negative electrode 36 were cut into a predetermined size. One end of an aluminum positive electrode lead 35a was connected to the current collector of the positive electrode. One end of a nickel negative electrode lead 36a was connected to the current collector of the negative electrode. Thereafter, the positive electrode 35 and the negative electrode 36 were rolled up with a separator 37 comprising a polyethylene resin microporous film, which is 20 μm in thickness and wider than the electrode plates, interposed therebetween, to produce an electrode plate group. The outer face of this electrode plate group was covered with the separator 37. An upper insulating ring 38a and a lower insulating ring 38b were fitted to the upper and lower parts of the electrode plate group, which was then placed into a battery case 31. Subsequently, a non-aqueous electrolyte was injected into the battery case to impregnate the electrode plate group therewith. The other end of the positive electrode lead 35a was welded to the backside of a sealing plate 32, whose circumference was fitted with an insulating gasket 33. The other end of the negative electrode lead 36a was welded to the inner bottom face of the battery case. Lastly, the opening of the battery case 31 was closed with the sealing plate 32. In this way, cylindrical lithium ion secondary batteries 1 to 9 were completed. Of the batteries 1 to 9, the batteries 1 to 6 are Examples of the present invention, and the batteries 7 to 9 are Comparative Examples.

The non-aqueous electrolyte used was prepared by dissolving lithium hexafluorophosphate ($LiPF_6$) at a concentration of 1 mol/L in a non-aqueous solvent mixture of ethylene carbonate and diethyl carbonate in a volume ratio of 1:1.

(5) Battery Evaluation (i) Discharge Capacity

In a constant temperature room of 20° C., each cylindrical battery was charged at a constant charge current of 0.2 C (1 C is 1 hour-rate current) until the battery voltage reached 4.05 V, and then charged at a constant voltage of 4.05 V until the current value reached 0.01 C. Thereafter, the cylindrical battery was discharged at a current of 0.2 C until the battery voltage dropped to 2.5 V. Table 1 shows the discharge capacity.

(ii) Cycle Life

After the above-mentioned measurement of the discharge capacity, the following charge/discharge cycle of the battery was repeated in a constant temperature room at 20° C.

Each battery was charged at a constant charge current of 1 C until the battery voltage reached 4.05 V, and then charged at a constant voltage of 4.05 V until the current value reached 0.05 C. Thereafter, the cylindrical battery was discharged at a current of 1 C until the battery voltage dropped to 2.5 V. This cycle was repeated. The ratio of the discharge capacity at the 100th cycle to the discharge capacity at the second cycle was expressed in percentage, which was defined as capacity maintenance rate (%). Table 1 shows the results. The closer the capacity maintenance rate is to 100%, the better the cycle life is.

TABLE 1

| Battery | Graphite (% by weight) | Alloying Material (% by weight) | Discharge capacity (mAh) | Capacity maintenance rate (%) |
|---|---|---|---|---|
| 1 | 95 | 5 | 1870 | 83 |
| 2 | 90 | 10 | 1790 | 89 |
| 3 | 80 | 20 | 1720 | 94 |
| 4 | 70 | 30 | 1660 | 95 |
| 5 | 60 | 40 | 1600 | 95 |
| 6 | 50 | 50 | 1550 | 95 |
| 7 | 98 | 2 | 1920 | 65 |
| 8 | 45 | 55 | 1320 | 95 |
| 9 | 30 | 70 | 1100 | 96 |

COMPARATIVE EXAMPLE 1

A negative electrode was produced by using graphite alone without using the alloying material a. A cylindrical lithium ion secondary battery 10 was produced in the same manner as in Example 1 except for the use of this negative electrode. Therein, 5 parts by weight of the binder (polyacrylic acid) was added per 100 parts by weight of graphite.

COMPARATIVE EXAMPLE 2

A negative electrode was produced by using the alloying material alone without using graphite and using, as an auxiliary conductive agent, 10 parts by weight of acetylene black (DENKA BLACK, manufactured by Denki Kagaku Kogyo K.K.) having a specific surface area of 70 $m^2$/g per 100 parts by weight of the alloying material a. A cylindrical lithium ion secondary battery 11 was produced in the same manner as in Example 1 except for the use of this negative electrode. Therein, 5 parts by weight of the binder (polyacrylic acid) was added per 100 parts by weight of the alloying material a.

The batteries of Comparative Examples 1 and 2 were evaluated in the same manner as in Example 1. Table 2 shows the results.

TABLE 2

| Battery | Graphite (% by weight) | Alloying Material (% by weight) | Discharge capacity (mAh) | Capacity maintenance rate (%) |
|---|---|---|---|---|
| 10 | 100 | 0 | 1030 | 96 |
| 11 | 0 | 100 | 1980 | 34 |

It can be seen that the batteries 1 to 6 of Example 1, using a negative electrode in which the weight percentage of the graphite relative to the total weight of the alloy a and the graphite is 50% to 95%, have improved capacities, particularly compared with Comparative Example 1, and have improved cycle lives compared with Comparative Example 2.

Also, the batteries of Comparative Examples 1 and 2 were disassembled after 100 cycles and evaluated for the degree of expansion. As a result, it was found that the negative electrode of Comparative Example 1 expanded 1.1-fold and the negative electrode of Comparative Example 2 expanded 3.2-fold, as compared with the thickness of the negative electrode before the charge/discharge. On the other hand, for example, the battery 3 of Example 1 was disassembled after 100 cycles and evaluated for the degree of expansion. As a result, an approximately 1.5-fold expansion was observed. That is, it was found that the batteries of Example 1 were able to suppress the expansion due to the alloying material while maintaining high capacity.

EXAMPLE 2

In producing a negative electrode, the mixing weight ratio of graphite (KS-44, manufactured by Timcal Ltd.) and the Ti—Si alloy (alloy a) was fixed at 80:20. Also, the above-mentioned acetylene black (DENKA BLACK, manufactured by Denki Kagaku Kogyo K.K., with a specific surface area of 70 $m^2$/g) or graphite with a specific surface area of 14 $m^2$/g (KS4, manufactured by Timcal Ltd.) was added as an auxiliary conductive agent, in parts by weight as listed in Table 3 per 100 parts by weight of the total of the alloying material a and the graphite (KS-44). As the binder, 5 parts by weight of polyacrylic acid was added.

Except for the above, in the same manner as in Example 1, cylindrical lithium ion secondary batteries 12 to 20 were produced. Therein, the whole amount of the alloying material a, 3 parts by weight of polyacrylic acid and a predetermined amount of acetylene black or KS4 were kneaded until they became homogeneous, and then, the graphite (KS-44) and the remaining polyacrylic acid were added and kneaded.

The batteries 12 to 20 of Example 2 were evaluated in the same manner as in Example 1. Table 3 shows the results.

TABLE 3

| Battery | Auxiliary conductive agent | | Discharge capacity (mAh) | Capacity maintenance rate (%) |
|---|---|---|---|---|
| | Kind | Amount (part by weight) | | |
| 12 | Acetylene black | 2 | 1750 | 96 |
| 13 | Acetylene black | 5 | 1690 | 95 |
| 14 | Acetylene black | 10 | 1590 | 95 |
| 15 | Acetylene black | 15 | 1130 | 96 |
| 16 | Graphite (KS4) | 2 | 1770 | 94 |
| 17 | Graphite (KS4) | 5 | 1700 | 93 |
| 18 | Graphite (KS4) | 10 | 1620 | 93 |
| 19 | Graphite (KS4) | 15 | 1500 | 90 |
| 20 | Graphite (KS4) | 30 | 1030 | 85 |

In the batteries of this Example, in which their negative electrodes included acetylene black or KS4 as the auxiliary conductive agent, their characteristics improved, and particularly their cycle life improved remarkably. Also, even when the amount of the auxiliary conductive agent was approximately 2 parts by weight, which is small, the capacity increased, in comparison with the case where no auxiliary conductive agent was added (battery 3 of Example 1).

A section of each negative electrode of this example was observed with an SEM, and a proper amount of the auxiliary conductive agent was found to be around the particles of the alloying material a. It is considered that such arrangement of the auxiliary conductive agent ensured sufficient conductivity of the negative electrode, thereby enabling the alloying material a to exhibit its maximum capacity.

EXAMPLE 3

(i) Battery 21

The Ti—Si alloying material with a wide particle size distribution of 0.5 am to 80 μm, which was obtained in the same manner as in Example 1, was put through a first sieve (45 μm mesh size) to remove particles larger than 45 μm. The alloy was then put through a second sieve (20 μm mesh size) to remove particles smaller than 20 μm, to obtain an alloy material (hereinafter referred to as alloying material b) with a particle size distribution of 20 to 45 μm and a mean particle size of 32 μm.

A cylindrical lithium ion secondary battery 21 was produced in the same manner as the battery 3 of Example 1 except for the use of the alloying material b.

(ii) Battery 22

The Ti—Si alloying material with a wide particle size distribution of 0.5 μm to 80 μm, which was obtained in the same manner as in Example 1, was put through a first sieve (20 μm mesh size) to remove particles larger than 20 μm. The alloying material was then put through a second sieve (10 μm mesh size) to remove particles smaller than 10 μm, to obtain an alloying material (hereinafter referred to as alloying material c) with a particle size distribution of 10 to 20 μm and a mean particle size of 13 μm.

A cylindrical lithium ion secondary battery 22 was produced in the same manner as the battery 3 of Example 1 except for the use of the alloying material c.

(iii) Battery 23

The Ti—Si alloying material with a wide particle size distribution of 0.5 μm to 80 μm, which was obtained in the same manner as in Example 1, was put through a sieve (10 g m mesh size) to remove particles larger than 10 μm, to obtain an alloying material (hereinafter referred to as alloying material d) with a maximum particle size of 10 μm and a mean particle size of 8 μm.

A cylindrical lithium ion secondary battery 23 was produced in the same manner as the battery 3 of Example 1 except for the use of the alloying material d.

The batteries 21 to 23 of Example 3 were evaluated in the same manner as in Example 1. Table 4 shows the results.

TABLE 4

| Battery | Mean particle size (μm) | Maximum particle size (μm) | Discharge capacity (mAh) | Capacity maintenance rate (%) |
|---|---|---|---|---|
| 21 | 32 | 44 | 1690 | 18 |
| 22 | 13 | 18 | 1700 | 26 |
| 23 | 8 | 10 | 1710 | 60 |

The batteries of this example had large initial capacities, but their charge/discharge cycle characteristics tended to be low. In the case of the batteries 21 and 22, in particular, the results were not as good as even those of Comparative Example 2. A section of the negative electrode of each of the batteries 21 to 22 was observed with an SEM, and it was found that the negative electrode had a structure different from that as shown in FIG. 1, with graphite particles and particles of alloying material agglomerating separately.

The batteries 21 and 22 were disassembled after 100 cycles, and their negative electrodes were observed. As a result, it was found that most of the material mixture separated from and fell off the current collector. Further, these current collectors were observed to be wrinkled and cracked at the edge thereof. This is probably because the stress exerted by the expansion of the alloy material deformed the current collectors, thereby leading to defects such as wrinkles and cracking. Also, in the battery 23, partial separation of the material mixture was observed.

COMPARATIVE EXAMPLE 3

The Ti—Si alloying material (alloying material a) used in Example 1 was introduced into an electric furnace and heat-treated at 1000° C. in a vacuum for 3 hours. As a result, the alloying material a turned into a highly crystalline alloying material (hereinafter referred to as alloying material e). The alloying material e was measured by X ray diffraction analysis, and the size of its crystal grains (crystallites) calculated from the half width of the most intensive peak based on the Scherrer equation was 1 μm. However, the particle size distribution of the alloying material e remained unchanged and the same as that of the alloying material a. Thus, the mean particle size of the alloying material e was 8 μm, and its maximum particle size was 10 μm.

A cylindrical lithium ion secondary battery 24 was produced in the same manner as the battery 3 of Example 1 except for the use of the alloying material e, and then evaluated in the same manner as in Example 1. Table 5 shows the results.

TABLE 5

| Battery | Crystal grain size (μm) | Discharge capacity (mAh) | Capacity maintenance rate (%) |
|---|---|---|---|
| 24 | 1 | 1640 | 11 |

The battery 24 has a high capacity, but its charge/discharge cycle characteristics are low. The battery 24 was disassembled after 100 cycles, and its negative electrode was observed. It was found that the particles of alloying material were further pulverized into sub-micron size. The reason is considered to be that the Si crystal phase, which was produced by the heat-treatment, was expanded and destroyed by the absorption of Li.

EXAMPLE 4

An alloying material was produced by the same synthesis method as that of Example 1, except for the use of Zr, Ni, Co, Mn, Fe or Cu (purity: 99.9%, particle size: 100 to 150 μm) as the transition metal M instead of metal Ti. The resultant alloying material was put through a sieve which was the same as that of Example 1, to obtain an alloying material with a maximum particle size of 8 μm and a mean particle size of 5 μm. Alloying materials using Zr, Ni, Co, Mn, Fe and Cu were named alloying materials f, g, h, i, j and k, respectively.

The alloying materials f to k were measured by X ray diffraction analysis, and the resultant XRD profiles were similar to that of FIG. 2, showing that these alloying materials were microcrystalline. Also, the size of crystal grains (crystallites) of each alloying material calculated from the half width of the most intensive peak based on the Scherrer equation was in the range of 9 to 25 nm.

The results of the X-ray diffraction analysis indicated that a Si-only phase (A phase) and a $MSi_2$ phase (B phase) were present in the alloying materials f to k. On the assumption that each of the alloying materials f to k was composed of these two phases only, the ratio between the Si-only phase and the $MSi_2$ phase was calculated. The $MSi_2$:Si weight ratios are shown in Table 6 (Si phase: 65 to 83% by weight).

Cylindrical lithium ion secondary batteries 25 to 30 were produced in the same manner as the battery 3 of Example 1 except for the use of the alloying materials f to k, and they were evaluated in the same manner as in Example 1. Table 6 shows the results.

TABLE 6

| Battery | Transition metal element M | $MSi_2$:Si (weight ratio) | Discharge capacity (mAh) | Capacity maintenance rate (%) |
|---|---|---|---|---|
| 25 | Zr | 25:75 | 1690 | 93 |
| 26 | Ni | 31:69 | 1650 | 89 |
| 27 | Co | 35:65 | 1630 | 90 |
| 28 | Mn | 22:78 | 1720 | 87 |
| 29 | Fe | 17:83 | 1740 | 88 |
| 30 | Cu | 28:72 | 1690 | 86 |

The results of the batteries 25 to 30 indicate that the use of any of the alloying materials results in a battery having both high capacity and long cycle life. It is noted that the Ti—Si alloying material (alloying material a) and the Zr—Si alloy (alloy f) exhibited particularly good charge/discharge cycle characteristics. This is probably because the particles of these alloying materials have higher electronic conductivity than other alloying materials, thereby providing good charge/discharge cycle characteristics without being influenced by expansion.

EXAMPLE 5

The Ti—Si alloying material with a wide particle size distribution of 0.5 μm to 80 μm, which was obtained in the same manner as in Example 1, was classified with various sieves, to obtain alloying materials each having a mean particle size of 2 μm, 5 μm or 7 μm and a maximum particle size of not larger than 10 μm.

Meanwhile, graphite (KS-44) was crushed and classified with sieves, to obtain graphite materials each having a mean particle size of 8 μm, 13 μm, 16 μm or 20 μm (uncrushed).

The alloying material and the graphite material thus obtained were mixed together in the combinations as listed in Table 7 such that graphite:alloy=80:20 (weight ratio). Except for this, in the same manner as the battery 3 of Example 1, cylindrical lithium ion secondary batteries 31 to 38 were produced, and they were evaluated in the same manner as in Example 1. Table 7 shows the results as well as the ratio of the mean particle size of the alloying material (R alloy) to the mean particle size of the graphite (R graphite), i.e., R alloy/R graphite.

TABLE 7

| Battery | Graphite mean particle size (μm) | Alloying Material mean particle size (μm) | $R_{alloy}/R_{graphite}$ | Discharge capacity (mAh) | Capacity maintenance rate (%) |
|---|---|---|---|---|---|
| 31 | 13 | 2 | 0.15 | 1590 | 81 |
| 32 | 13 | 5 | 0.38 | 1660 | 88 |
| 33 | 13 | 7 | 0.54 | 1700 | 84 |
| 34 | 8 | 2 | 0.25 | 1540 | 89 |
| 35 | 8 | 7 | 0.88 | 1430 | 70 |
| 36 | 16 | 2 | 0.13 | 1550 | 48 |
| 37 | 16 | 5 | 0.31 | 1730 | 84 |
| 38 | 20 | 2 | 0.10 | 1560 | 37 |

The batteries 36 and 38 had relatively short cycle lives. The R alloy/R graphite values of the batteries 36 and 38 were lower than 0.15. A section of the negative electrodes of these batteries was observed with an SEM, and it was found that a large number of particles of alloying material were squeezed and agglomerated between graphite particles. Therefore, when these batteries were disassembled after 100 cycles to observe their negative electrodes, part of the negative electrode material mixture was found to be separated from the current collector.

On the other hand, when the R alloy/R graphite value was in the range of 0.15 to 0.9, high capacity and good cycle life were obtained. Also, when the R alloy/R graphite value was in the range of 0.2 to 0.4, particularly high capacity and long cycle life were obtained. A section of the negative electrodes of these batteries was observed, and it was found that these negative electrodes had a structure as shown in FIG. 1, with particles of alloying material evenly dispersed between graphite particles.

As described above, the negative electrode for a non-aqueous electrolyte secondary battery in accordance with the present invention provides an excellent non-aqueous electrolyte secondary battery having both high capacity and good charge/discharge cycle characteristics. The present invention is applicable to non-aqueous electrolyte secondary batteries in any form. For example, the present invention is applicable not only to cylindrical batteries described in Examples, but also to batteries of coin, rectangular, or flat shape with a wound or layered electrode plate group. The non-aqueous electrolyte secondary battery of the present invention is useful as a main power source of mobile communications appliances or portable-electronic appliances.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A negative electrode for a non-aqueous electrolyte secondary battery, comprising graphite and an alloying material capable of electrochemically absorbing and desorbing Li,
    said alloying material comprising an A phase composed mainly of Si and a B phase comprising an intermetallic compound of at least one transition metal element and Si,
    at least one of said A phase and said B phase comprising a microcrystalline or amorphous region,
    the weight percentage of said A phase relative to the total weight of said A phase and said B phase being greater than 40% and not greater than 95%,
    the weight percentage of said graphite relative to the total weight of said alloy material and said graphite being not less than 65% and not greater than 85%, wherein:
    said alloying material exists in gaps between particles of said graphite,
    said alloying material has a maximum particle size of 10 µm or less, and
    the ratio of the mean particle size of said alloying material to the mean particle size of said graphite is in the range of 0.15 to 0.90.

2. The negative electrode for a non-aqueous electrolyte secondary battery in accordance with claim 1, further comprising an auxiliary conductive agent, said auxiliary conductive agent having a specific surface area of 10 $m^2/g$ or more.

3. The negative electrode for a non-aqueous electrolyte secondary battery in accordance with claim 2, wherein the weight percentage of said auxiliary conductive agent relative to the total weight of said alloying material, said graphite and said auxiliary conductive agent is 10% or less.

4. The negative electrode for a non-aqueous electrolyte secondary battery in accordance with claim 1, wherein both said A phase and said B phase comprises a microcrystalline or amorphous region.

5. A non-aqueous electrolyte secondary battery comprising a positive electrode capable of electrochemically absorbing and desorbing Li, a negative electrode and a non-aqueous electrolyte,
    said negative electrode comprising graphite and an alloying material capable of electrochemically absorbing and desorbing Li,
    said alloying material comprising an A phase composed mainly of Si and a B phase comprising an intermetallic compound of at least one transition metal element and Si,
    at least one of said A phase and said B phase comprising a microcrystalline or amorphous region,
    the weight percentage of said A phase relative to the total weight of said A phase and said B phase being greater than 40% and not greater than 95%,
    the weight percentage of said graphite relative to the total weight of said alloying material and said graphite being not less than 65% and not greater than 85%, wherein:
    said alloying material exists in gaps between particles of said graphite,
    said alloying material has a maximum particle size of 10 µm or less, and
    the ratio of the mean particle size of said alloying material to the mean particle size of said graphite is in the range of 0.15 to 0.90.

* * * * *